Patented June 30, 1925.

1,544,488

UNITED STATES PATENT OFFICE.

CHARLES FREDERIC SHERWOOD, OF MILL VALLEY, CALIFORNIA.

MEANS FOR REDUCING FRICTION.

No Drawing. Application filed March 17, 1921. Serial No. 453,139.

*To all whom it may concern:*

Be it known that I, CHARLES FREDERIC SHERWOOD, a citizen of the United States, and a resident of Mill Valley, county of Marin, State of California, have invented new and useful Improvements in Means for Reducing Friction, of which the following is a specification.

My invention has for its object the reduction of friction between two rubbing surfaces which are in movement with respect to each other. It has heretofore been customary in lubricating such surfaces to apply oil or grease which forms a film between the two surfaces. This film is maintained by adhesion of the particles of the lubricant among themselves and to the surfaces, and by the particles of the lubricant rolling between the surfaces. The friction that would otherwise be developed is greatly reduced. The surfaces are in fact kept separated by a liquid or semi-liquid film.

My invention consists of establishing and maintaining a film of mercury between the moving surfaces which would be otherwise in contact. This I accomplish preferably by employing an amalgam or solution of a metal in mercury between the rubbing surfaces or by using initially a salt or mixture of mercury from which mercury may be deposited.

When a suitable metal surface is amalgamated with mercury the surface becomes extremely smooth and has a greasy and unctious property. It is immaterial whether the movement of the two rubbing surfaces be reciprocating or rotating, or whether the stationary or moving member or both are amalgamated. In any event I have found that the interposition of mercury between the two moving surfaces acts as a suitable lubricant for the elimination of friction.

In the case of a journal and bearing of steel and cast iron respectively, my invention may be practiced by fitting a bushing therebetween or by coppering the surface of either the journal or bearing or both, as by a wash of copper sulphate or by electroplating one or both of the parts with copper, or any other metal with which mercury will amalgamate. Thereafter a coating of mercury is applied to the said copper or other metal, whereby a thin layer or film of adhering amalgam is established between the shaft and the journal. I have found that such a combined journal and bearing will rotate without the employment of other lubricant and will operate with an extremely small friction coefficient and with a long life and high degree of operative efficiency.

Instead of electroplating a shaft or bearing, a metal sleeve may be inserted or pressed in or applied to the bearing surface by welding, soldering or other means of attachment. Such sleeve, however, should preferably be of a metal capable of being amalgamated on its surface, or at least have a portion of its surface consisting of said metal.

My invention is particularly applicable to the types of bearings, pivots, pintles, bolts, and bushings as used on vehicles. The shackle bolts on motor cars are under heavy bearing pressure but have a relatively small amount of movement. Under these conditions bushings may be employed with advantage made of bronze and amalgamated and with felt gaskets or washers at each end to keep out the dust. When such bushings are assembled my invention provides a non-wearing, anti-friction surface for the shackle bolt to operate on, requiring no other lubrication than the mercury surface.

My invention is also applicable to many other classes of bearings, shafts, and other frictional surfaces, as for example in operating under water, where it has heretofore been found extremely difficult to establish a proper lubricant by maintaining an oil film.

It is not essential to my invention that the rubbing surfaces be coated with an amalgamating metal and thereafter treated with mercury or that a sleeve, capable of being amalgamated, be inserted. I have found that the employment of amalgam between existing journals and bearings, as the application of an amalgam as a paste to existing bearings accomplishes the desired result. Finely divided metallic mercury may also be mixed with grease and the composition used for lubricating purposes to good advantage.

When an ordinary brass or bronze bushing for a bearing surface is amalgamated, the amalgamation makes the bearing surface itself smooth and true. In such a case the amalgam fills the irregularities of the surface as a thin film which readily conforms to the rotating or reciprocating member. In this way I obtain an extremely smooth surface without the expenditure of skilled labor for scraping and fitting such a bearing.

Such method of producing a superior bearing surface is more fully set forth in my copending application, Serial No. 453,140 filed March 17, 1921.

Metals not capable of being amalgamated may be plated with metals capable of amalgamating with mercury as copper, silver, etc., and thereby rendered adaptable to my invention. This may be done by electrolytic plating or by dipping, such as tinning, and then amalgamating the thin metallic surface so formed. It should also be borne in mind that in preparing copper or bronze surfaces previous to amalgamation, such surfaces should be thoroughly cleaned as by a cyanide wash before the mercury is applied.

Although I have applied my invention particularly to steel journals, cast iron bearings, bushings and the like, it is to be borne in mind that any rubbing surfaces, preferably resistant to amalgamation, between which is employed an amalgam, is a practice of my invention. It is immaterial whether metallic mercury, salts of mercury, or electrolytic deposition be used, or whether the film be obtained by the introduction of paste in an existing bearing, or by a copper or bronze sleeve with an amalgam surface is inserted. These forms and other modifications are all within the spirit and scope of my invention, and I desire to be understood as claiming all such.

I claim:

1. In a bearing, two solid surfaces adapted to relative movement and a layer of a metal therebetween having an amalgamated surface, said amalgam containing an excess of mercury.

2. In a bearing, surfaces adapted to relative movement, a bushing of an amalgamable metal therebetween and an excess of mercury on said bushing adapted to serve as a lubricant between the surfaces.

3. In a bearing, surfaces adapted to relative movement and amalgam therebetween, said amalgam containing an excess of mercury.

In testimony whereof, I have hereunto set my hand at San Francisco, California, this 12th day of March 1921.

CHARLES FREDERIC SHERWOOD.